United States Patent
Presley

(10) Patent No.: US 8,041,796 B2
(45) Date of Patent: Oct. 18, 2011

(54) PROCESS DURATION CONTROL

(75) Inventor: Joe K. Presley, Collins, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2260 days.

(21) Appl. No.: 10/136,483

(22) Filed: May 2, 2002

(65) Prior Publication Data

US 2003/0208580 A1    Nov. 6, 2003

(51) Int. Cl.
*G06F 15/173*    (2006.01)

(52) U.S. Cl. ......... 709/223; 718/100; 718/102; 702/176

(58) Field of Classification Search .......... 709/223–227; 718/100–104, 106; 702/176–186
See application file for complete search history.

(56) References Cited

U.S. PATENT DOCUMENTS

| | | | | |
|---|---|---|---|---|
| 5,522,070 A * | 5/1996 | Sumimoto | | 718/104 |
| 6,334,139 B1 * | 12/2001 | Sakakura | | 709/202 |
| 6,385,637 B1 * | 5/2002 | Peters et al. | | 718/107 |
| 6,466,962 B2 * | 10/2002 | Bollella | | 718/107 |
| 6,697,870 B1 * | 2/2004 | Cafarelli et al. | | 709/233 |
| 6,779,182 B1 * | 8/2004 | Zolnowsky | | 718/103 |
| 6,785,889 B1 * | 8/2004 | Williams | | 718/104 |
| 6,792,445 B1 * | 9/2004 | Jones et al. | | 718/107 |
| 6,927,770 B2 * | 8/2005 | Ording | | 345/440 |
| 7,512,946 B2 * | 3/2009 | MacLellan | | 718/101 |
| 2002/0147759 A1 * | 10/2002 | Ranganathan | | 709/104 |
| 2002/0194263 A1 * | 12/2002 | Murren et al. | | 709/203 |

\* cited by examiner

*Primary Examiner* — Greg C Bengzon

(57) ABSTRACT

A computer system incorporates means, and corresponding methods, for controlling access and usage of one or more processors in the computer system. The means may include hardware and software features. The means may operate according to specified steps according to a specific algorithm. In an embodiment, the system may include a discovery executable that discovers a target process for duration management. The system may further include a duration monitor that determines a percent completion of a target process. The percent completion information may be provided to a process duration controller that uses process information and the percent completion information to calculate a run-time metric. The run-time metric may then be provided to a process resource manager that controls resources consumed by the target process.

16 Claims, 4 Drawing Sheets

PROCESS DURATION CONTROL

TECHNICAL FIELD

The technical field is use control of assets in a computer system that executes multiple processes.

BACKGROUND

Modern computer systems may execute multiple processes in parallel fashion. However, this parallel operation may impose performance penalties on the computer system when one or more of the parallel processes consumes so much of the limited resources of the computer system that a higher priority process cannot use the resources needed to complete execution in an expected, design timeframe. Alternatively, once one process has initiated, subsequent processes may not be able to execute until completion of the first process, even though processor resources would otherwise be available.

SUMMARY

A computer system incorporates means for controlling access and usage of one or more processors in the computer system. The means may include hardware and software features. The means may operate according to specified steps according to a specific algorithm. In an embodiment, the system may include a discovery executable that discovers a target process for duration management. The system may further include a duration monitor that determines a percent completion of a target process. The percent completion information may be provided to a process duration controller that uses process information and the percent completion information to calculate a run-time metric. The run-time metric may then be provided to a process resource manager that controls resources consumed by the target process.

An apparatus for controlling resources in a computer system may include means for identifying target processes for duration management, means, coupled to the identifying means, for receiving process information for the identified target processes, means, coupled to the receiving means, for monitoring process information from the target processes, means, coupled to the monitoring means, for computing process run-time metrics, and means, coupled to the computing means, for receiving the run-time metrics and for adjusting the resources based on the received run-time metrics.

A method for controlling resources in a computer system may include the steps of discovering a target process executing on the computer system, including determining target process information, monitoring completion of the target process, wherein percent completion information for the target process is determined, providing the percent completion information and the target process information to a process duration controller, computing a run-time metric based on the received information, providing the run-time metric to a resource manager, and adjusting allocation of the resources in the computer system consistent with the run-time metric.

DESCRIPTION OF THE DRAWINGS

The detailed description will refer to the following drawings, wherein like numerals refer to like elements, and wherein.

DETAILED DESCRIPTION

Figure 1:
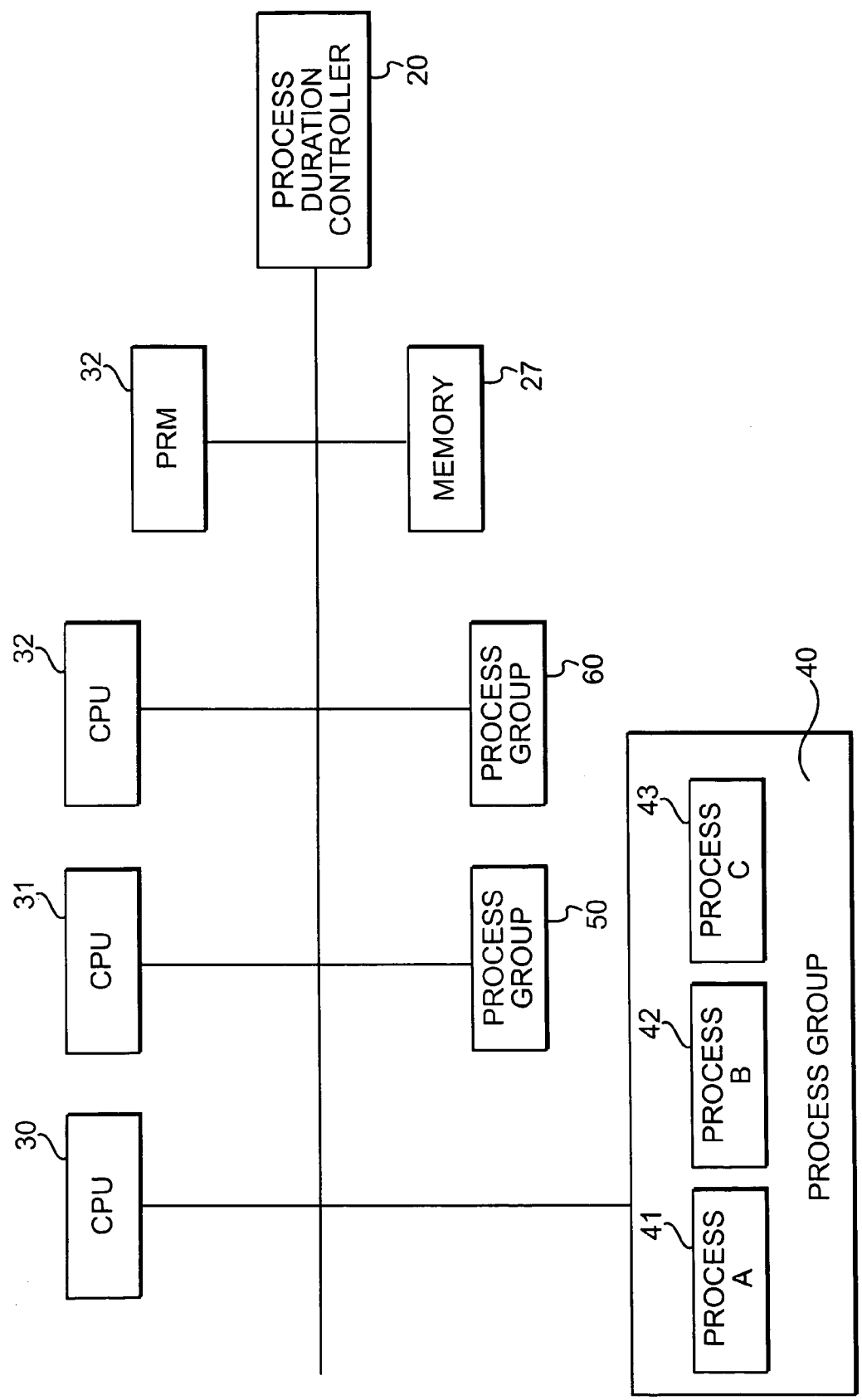
FIG. 1 is a block diagram of a system that uses a process duration controller.

FIG. 1 illustrates a system 10 having a process duration controller 20, a process resource manager 25 coupled to the process duration controller 20, a memory 27, central processing units 30, 31, and 32, and process groups 40, 50 and 60. The process resource manager 25 may be implemented as a software routine executing on a specific computer architecture and may be extended for use with various known operating systems such as Linux, HP and Windows®, for example. The process duration controller 20 may be an add-on to the process resource manager 25.

The system 10 uses the process duration controller 20 and the process resource manager 25 to control resource utilization by an application, program, or process running on the system 10. System operating data may be stored in the memory 27, and such stored operating data may be used by the process duration controller 20 and the process resource manager 25 to optimize or otherwise control utilization of the system resources.

The system 10 is shown with three CPUs 30, 31, and 32. However, the system 10 may operate with more or fewer CPUs. In addition, the system 10 could be configured with other processor types, such as application specific integrated circuits (ASICs), for example. In the system 10, the CPUs 30-32 represent shared resources. The system 10 may also include other shared resources besides processors. Such other resources include printers, memory, and input/output (I/O) devices, for example. The system 10 supports execution of one or more applications, programs or processes. As illustrated by way of example, the process group 40 includes three processes 41, 42, and 43. Other process groups, such as the processor groups 50 and 60 may include additional processes.

The processes 41-43 may execute (i.e., be active) simultaneously in real time, may execute sequentially in real time, or may execute in any combination of simultaneous/sequential real time operation. That is, the processes 41-43 may execute in some overlapping real-time fashion. Furthermore, the processes 41-43 may execute over different increments of real time. Finally, the processes 41-43 may have different priorities of execution. However, if a lower priority process is already executing, execution of a higher priority process may be blocked, or delayed, until execution of the active, lower priority process completes.

When executing in an overlapping fashion, the processes 41-43 may compete for resources of the system 10. As noted above, one such resource is the system processors, which in the illustrated example include the CPUs 30-32. Thus, if the process 41 begins execution at time 0, while the other processes 42 and 43 are not executing, then the process 41 may consume all the processor resources of the system 10 until execution of the process 41 is complete. Alternatively, execution of the process 41 may proceed in a step-wise manner in which during specific units of computer time (i.e., computer cycles), the process 41 is executing followed by units of computer time when the process 41 is not executing. This step-wise execution in computer time may continue until execution of the process 41 is complete. While the process 41 is executing in this step-wise fashion, the process 41 may consume all the processor resources of the system 10. During computer time in which the process 41 is not executing, other processes 42, 43 may consume the processor resources of the system 10.

The fact that a specific process, such as the process 41, could consume all the processor resources of the system 10 (or could consume all of another type of resource of the system 10) may present a problem in terms of overall system operation when intended execution of processes overlaps. In particular, when intended process execution overlaps, one process could prevent or slow down execution of one or more other processes. To optimize operation of the system 10, the process duration controller 20 monitors all active processes, such as the processes 41-43 when executing or active, and the process resource manager 25 controls the execution or run-rate of the processes by allocating processor resources among the processes 41-43. The process duration controller 20 may interact with the process resource manager 25 in order to achieve specific performance goals for each of the processes 41-43 and the system 10.

To properly manage and allocate system resources, data related to operation of the processes on the system 10 is required. For example, data related to the computer time (cycles or clicks) that each of the processes 41-43 need to execute may be gathered and stored in the system 10, and then used to manage or allocate processor resources to the processes 41-43. In this context, a tick is approximately the number of CPU cycles that are available in $\frac{1}{100}^{th}$ of a second. A metric may be defined for each process, such as the processes 41-43, that specifies the tick-rate (ticks per second) at which the process should execute. Other metrics, such as total cycles, cycles per second, seconds (real time), may also be defined or specified for execution of a process. The process duration controller 20, in conjunction with the process resource manager 25 may then use the specified metric (e.g., ticks per second) to control execution of a specific process. For example, if the process 41 is active, the process duration controller 20 may assign only enough CPU capacity to execution of the process 41 so that such execution is completed at the specified tick rate. Other active processes would then have access to remaining CPU resources such that these other active processes are also able to execute at their specified tick rate.

In operation, the process duration controller 20 manages the duration of active processes by monitoring an average number of ticks the process duration controller 20 receives over a pre-defined interval (the process resource management interval), comparing the average number of ticks received over the interval (i.e., the measured tick rate) to the number of ticks that the process should receive during that same interval (the desired tick rate), and sending a ratio of the measured tick rate to desired tick rate to the process resource manager 25 for any needed CPU resource allocation adjustment. The desired tick rate may be based on a user-defined and desired process duration. When the ratio equals 1, the process is receiving the proper CPU resource allocation to satisfy the user's requirement for process duration.

The process resource manager 25 uses previous run-time values (i.e., historical ticks for the process) as a basis for calculating a final execution time of the process being managed. The historical ticks represents the expected number of ticks that the process would normally receive from the process resource manager 25 to complete the process. The historical ticks may be updated as the process is repeatedly executed on the system 10. The historical ticks may be stored in the memory 27. As noted above, other metrics besides ticks may be used to allocate resources to a specific process.

Figure 2:
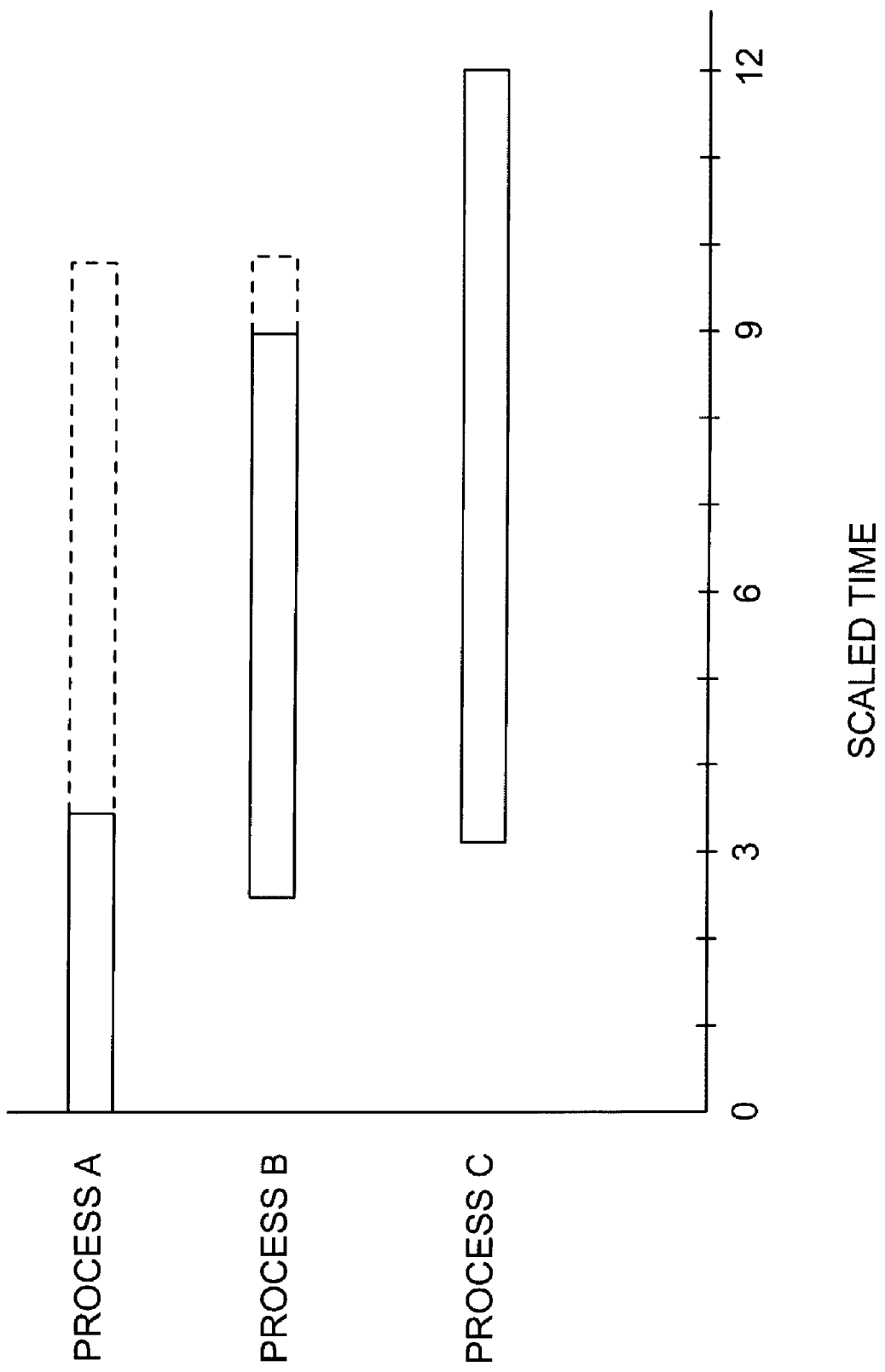
FIG. 2 is a graph that illustrates an operation of the system of FIG. 1.

FIG. 2 is a graph illustrating an operation of the system 10 of FIG. 1. Three processes, A, B, and C execute in overlapping fashion with respect to scaled time to complete the operation. Each of the processes A, B, and C execute over different lengths of time as shown. Completion of process B may be the critical path for overall completion of the operation. The first process to begin execution, process A, could consume such a large percentage of the system 10 resources that completion of the critical path process B may be delayed, thereby negatively affecting the system 10 performance.

To ensure optimum execution of the operation on the system 10, the completion of process A may be extended, as illustrated by the dashed lines, thereby freeing system 10 resources for execution of the processes B and C. In addition, process B execution may also be extended, thereby freeing additional resources to execute the process C. One method for extending the execution of the processes A and B is to limit the number of CPU ticks available to each of the processes A and B. The process resource manager 25 may be used to so limit the CPU ticks to the processes A, B, and C.

Figure 3:
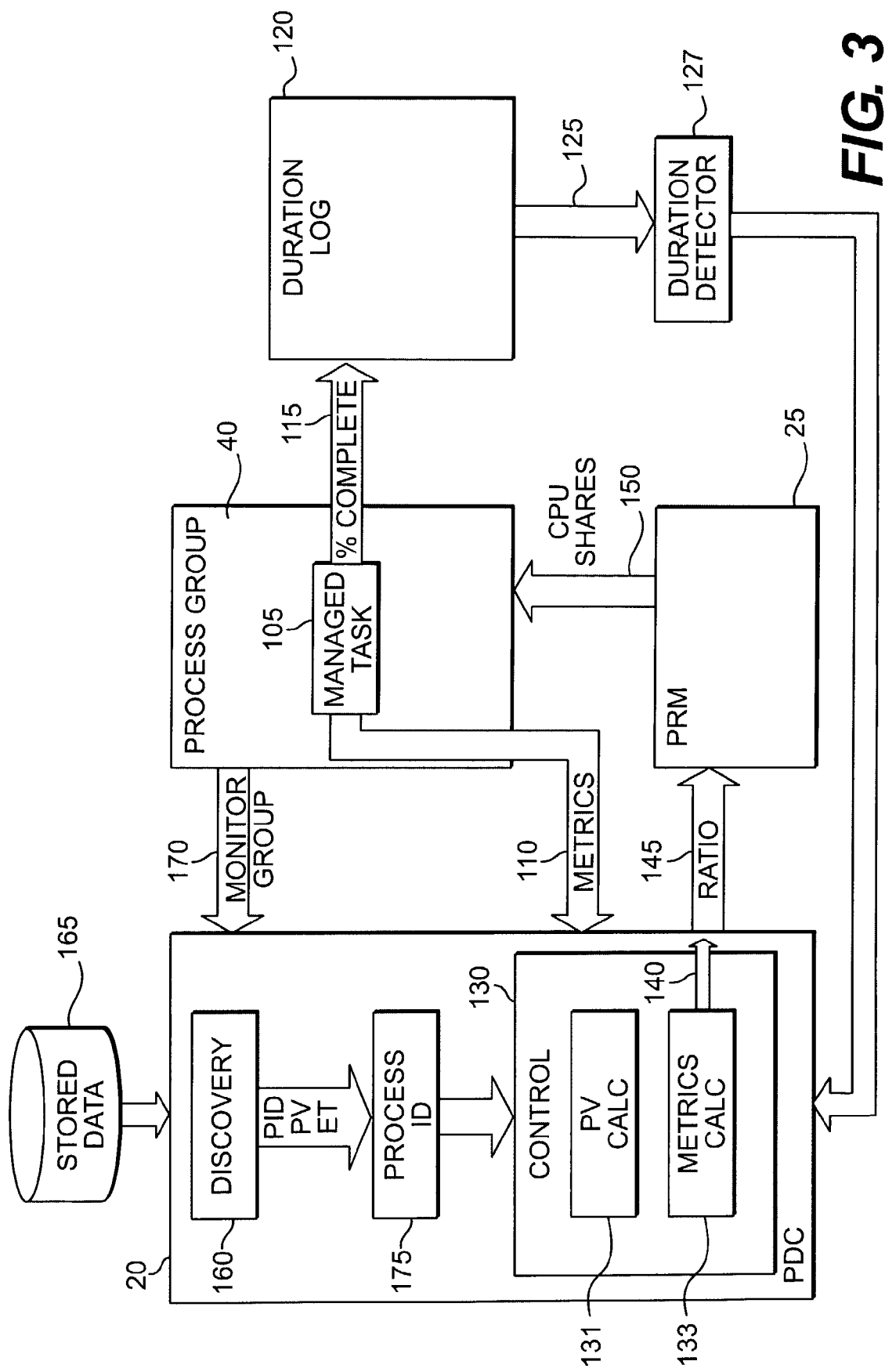
FIG. 3 is a further diagram of the process duration controller and related components of the system of FIG. 1.

FIG. 3 is a diagram showing operation of the process duration controller 20 and other components of the system 10 of FIG. 1. In FIG. 3, the process group 40 begins execution of duration managed task 105, from which process metrics data 110 and percent complete data 115 are generated. The percent complete data 115 may be provided to a duration log 120. The duration log 120 provides job progress data 125 to a log file 127, which functions to detect completion of a task. The process metrics data 110 are provided to the process duration control module 130. The process duration control module 130 may include a profile calculator 131 that computes a new, or updated, profile value 135 using the log file 127 data. The module 130 may also include a metrics calculator 133 that computes a ticks per second value 140 using the process metrics data 110. The metrics calculator 133 uses the calculated ticks per second value 140 to compute a ratio 145 of the required to actual ticks per second. The ratio 145 is provided to the process resource manager 25, which in turn controls 150 CPU assets for execution of the duration managed task 105.

Also shown in FIG. 3 is a discovery executable 160 that can be used to identify a duration-controlled task or process. The discovery executable 160 may start at the beginning of a duration-management cycle, and may run until a duration-controlled task or process has been identified. The discovery executable 160 allows a user to identify target processes and tasks (process identification—(PID)) for duration control, and allows creation of a profile value (PV) and a desired elapsed time (ET) for execution of the process or task. The discovery executable 160 may used process stored data 165, and may receive process group data 170 in order to discover 175 the process or task to control.

Figure 4:
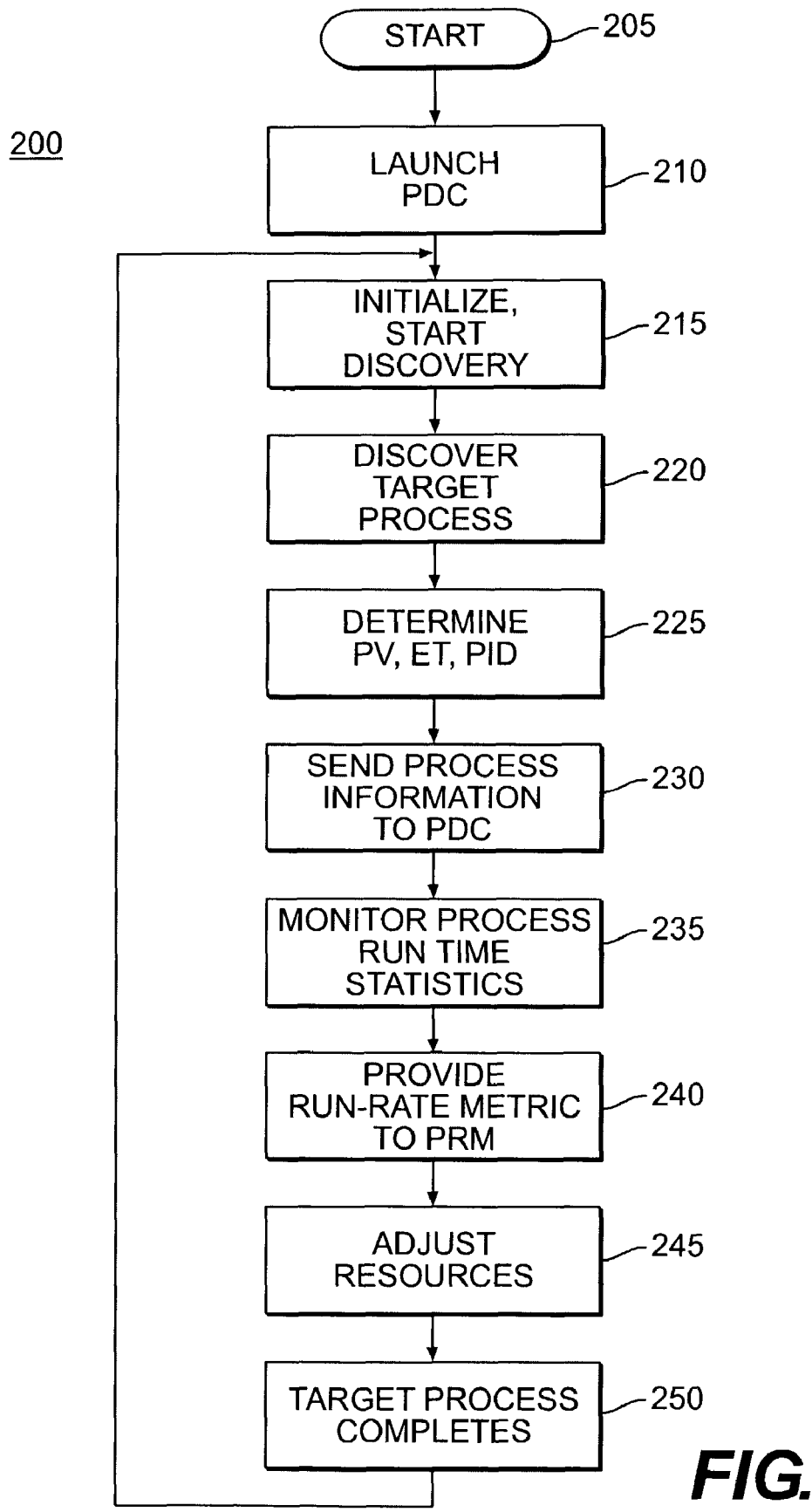
FIG. 4 is a flowchart illustrating an operation of the process duration controller of FIG. 3.

FIG. 4 is a flowchart illustrating a duration management cycle operation 200 used in the system 10 of FIG. 1. The operation 200 begins in block 205. In block 210, the process resource manager 25 launches the process duration controller 20. The process duration controller 20 establishes a direct connection with a monitoring API of the process resource manager 25 in order to provide metrics data to the process resource manager 25. In block 215, the process duration controller 20 initializes, including starting the discovery executable 160. The discovery executable 160 discovers a process, or task, block 220, and then determines the profile value and elapsed time, block 225. In block 230, the discovery executable 160 sends the profile value and the elapsed time to the process duration controller 20. In block 235 the process duration controller 20 monitors run time statistics for the identified process, and calculates the run-rate metric (ratio or percent required tick rate and actual tick rate). In block 240, the process duration controller 20 provides the run-rate metric to the process resource manager 25. In block 245, the process resource manager 25 adjusts work share among any executing processes consistent with the run-rate metric. In block 250, the target process or task ends. The operation 200 then returns to block 215.

While the invention has been described with reference to the above embodiments it will be appreciated by those of ordinary skill in the art that various modifications can be made to the structure and function of the individual parts of the system without departing from the spirit and scope the invention as a whole.

The invention claimed is:

1. A non-transitory computer useable storage medium having computer readable program code embedded therein that controls the duration of one or more processes executing in a computer system, the program code comprising:
- a discovery executable that discovers a target process to be managed, wherein process information is discovered;
- a duration detector that receives data from the target process and determines percent complete information for the target process;
- a process duration control module coupled to the discovery executable and the duration detector that receives the process information and the percent complete information and computes a run-time metric, wherein the run-time metric comprises a ratio of a required run-time parameter to an actual run-time parameter, and wherein the process duration control module measures the actual run-time parameter by monitoring an average number of ticks the process duration controller receives from the target process over a pre-defined interval; and
- a process resource manager that receives the run-time metric and adjusts computer resources available to the target process consistent with the run-time metric.

2. The computer readable storage medium of claim 1, wherein the required run-time parameter and the actual run-time parameter relate to a number of ticks per second of processor operation.

3. The computer readable storage medium of claim 1, wherein the process information comprises process identification, process profile value, and process elapsed time.

4. The computer readable storage medium of claim 3, wherein the process elapsed time is based on historical data related to execution of the target process.

5. The computer readable storage medium of claim 4, wherein the historical data are updated following an execution of the target process.

6. The computer readable storage medium of claim 1, wherein the process duration control module comprises a metrics calculator that receives the percent complete information from the target process, and wherein the metrics calculator updates the run-time metric.

7. The computer readable storage medium of claim 1, wherein the process duration control module comprises a profile calculator that determines a profile value of the target process upon execution of the target process.

8. A method for controlling resources in a computer system, comprises:
- discovering a target process executing on the computer system, including determining target process information;
- monitoring completion of the target process, wherein percent completion information for the target process is determined;
- providing the percent completion information and the target process information to a process duration controller;
- computing a run-time metric based on the received information, comprising;
- measuring an actual run time parameter by monitoring an average number of ticks received from the target process over a pre-defined interval; and
- determining a ratio of a required run-time parameter to the actual run-time parameter providing the run-time metric to a resource manager; and
- adjusting allocation of the resources in the computer system consistent with the run-time metric.

9. The method of claim 8, wherein the required run-time parameter and the actual run-time parameter relate to a number of ticks per second of processor operation.

10. The method of claim 8, wherein the process information comprises process identification, process profile value, and process elapsed time.

11. The method of claim 10, further comprising:
- measuring actual elapsed time for one or more executions of the target processes in the computer system;
- and storing the measured actual process elapsed time as historical data, wherein the process elapsed time is based on historical data related to execution of the target process.

12. The method of claim 11, further comprising updating the historical data updated following an execution of the target process.

13. The method of claim 8, further comprising determining a profile value of the target process upon execution of the target process.

14. The method of claim 13, further comprising storing the profile value of the target process.

15. A method for allocating resources in a computer system, comprising:
- discovering one or more target processes executing on the computer system;
- determining a run-time metric for each of the discovered target processes, wherein the run-time metric comprises a ratio of a required run-time parameter to an actual run-time parameter, and wherein the actual run-time parameter is measured by monitoring an average number of ticks received from the discovered target processes over a pre-defined interval; and
- adjusting allocation of the resources based on the run time metric determined for each of the discovered target processes.

16. The computer readable storage medium of claim 1, wherein the process duration controller limits a number of ticks available to the target process.

* * * * *